(12) United States Patent
Katz

(10) Patent No.: US 6,241,599 B1
(45) Date of Patent: Jun. 5, 2001

(54) PRESSURE REGULATING SYSTEM

(76) Inventor: David L. Katz, 465 Tom Swamp Rd., Mt. Carmel, CT (US) 06518

( * ) Notice: Subject to any disclaimer, the term of this patent is extended or adjusted under 35 U.S.C. 154(b) by 0 days.

(21) Appl. No.: 09/375,691

(22) Filed: Aug. 17, 1999

(51) Int. Cl.$^7$ .................................................. B24D 13/00
(52) U.S. Cl. ................................ 454/70; 454/71; 454/73; 454/74
(58) Field of Search ................................. 454/70, 71, 73, 454/74

(56) References Cited

U.S. PATENT DOCUMENTS

| | | | |
|---|---|---|---|
| 2,669,175 | 2/1954 | Fischer | 454/73 |
| 2,966,109 | * 12/1960 | Best | 454/71 |

* cited by examiner

Primary Examiner—Jiping Lu
(74) Attorney, Agent, or Firm—Bachman & LaPointe, P.C.

(57) ABSTRACT

The present invention relates to a pressure regulation system for maintaining the air pressure within a defined space at a substantially constant level. The pressure regulation system comprises a housing and a flexible diaphragm within the housing which divides the housing into first and second chambers. The first chamber contains air at a desired or reference pressure. The second chamber communicates with the defined space and contains air at the same pressure as that in the defined space. The system further includes a laser system for detecting movement of the diaphragm due to pressure imbalance between the first and second chambers and a system for introducing air into or withdrawing air from the defined space when a pressure imbalance is detected. The pressure regulation system of the present invention has particular utility in aircraft systems for maintaining substantially constant pressure in the passenger cabin.

12 Claims, 2 Drawing Sheets

PRESSURE REGULATING SYSTEM

BACKGROUND OF THE INVENTION

The present invention relates to a pressure regulation system for maintaining the air pressure within a defined space at a substantially constant level. The pressure regulation system has particular utility on aircraft.

There are many situations where it is desirable to maintain pressure within a defined space such as a passenger compartment at a substantially constant level. For example, to prevent passenger discomfort, it is desirable to maintain the pressure in an aircraft passenger compartment at a substantially constant level throughout a flight.

Systems for controlling aircraft cabin pressure are known in the art. U.S. Pat. No. 2,669,175 to Fischer discloses one such system. The Fischer system is designed to regulate the pressure within the passenger cabin relative to a preset pressure. The system includes a flexible diaphragm positioned within a housing; however, the diaphragm does not communicate directly with the passenger cabin. The Fischer system suffers from the deficiency that it is unnecessarily complex.

Despite the existence of systems such as Fischer's, there remains a need for pressure regulation systems which are simple in construction, which provide better pressure control, and which have a great deal of versatility.

SUMMARY OF THE INVENTION

Accordingly, it is an object of the present invention to provide a pressure regulation system for controlling the pressure within a defined space.

It is a further object of the present invention to provide a pressure regulation system as above which has particular utility in aircraft for controlling the pressure within a passenger compartment.

The foregoing objects are attained by the pressure regulation system of the present invention.

In accordance with one embodiment thereof, the pressure regulation system of the present invention includes a housing and a flexible diaphragm within the housing. The flexible diaphragm divides the housing into first and second chambers with the first chamber containing air at a desired pressure and the second chamber containing air at a pressure within a defined space outside the housing. The pressure regulation system further comprises means for detecting movement of the diaphragm due to a pressure imbalance between the first and second chambers and means, activated by the detecting means, for introducing air into or withdrawing air from the defined space so as to alleviate the pressure imbalance.

Other details of the pressure regulation system of the present invention, as well as other objects and advantages attendant thereto, are set forth in the following written description and the accompanying drawings, wherein like reference numerals depict like elements.

DETAILED DESCRIPTION OF THE PREFERRED EMBODIMENT(S)

Figure 1:
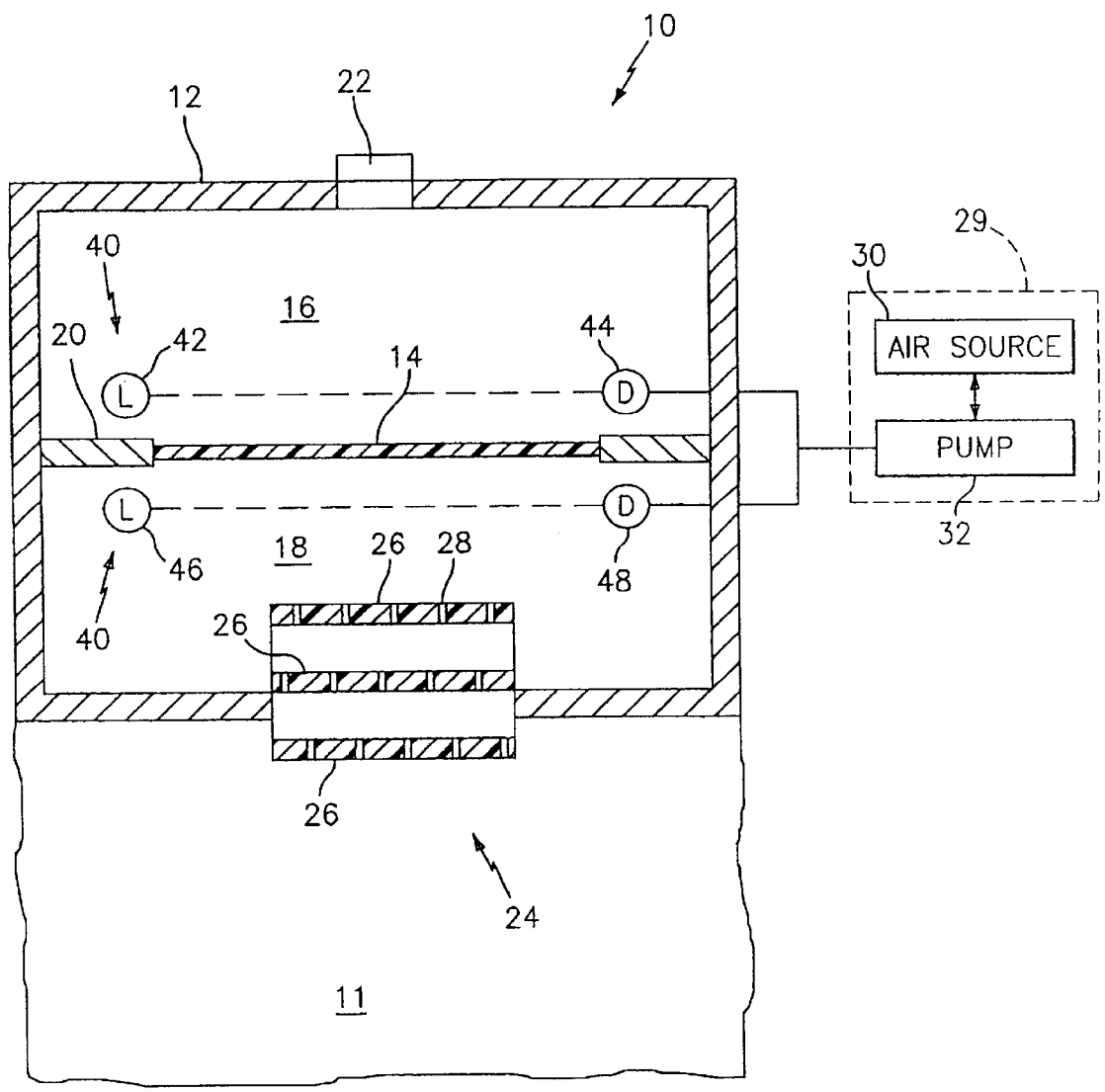
FIG. 1 is a schematic representation of the pressure regulation system of the present invention.

Referring now to the drawings, FIG. 1 illustrates a first embodiment of a pressure regulation system 10 in accordance with the present invention. The pressure regulation system 10 is used to maintain the air pressure within a defined space 11 at a substantially constant level. The defined space 11 may be a passenger compartment in an aircraft or any other chamber with a pressurized atmosphere which needs to be maintained at a substantially constant pressure.

The pressure regulation system 10 includes a housing 12 which may be formed from any suitable metal or non-metallic material known in the art. A diaphragm 14, in the form of a movable membrane, is placed within the housing 12 so as to divide the housing into first and second chambers 16 and 18, respectively. Preferably, the diaphragm 14 divides the housing 12 so that the chambers 16 and 18 have substantially the same volume. The diaphragm 14 may be mounted within the housing 12 in any suitable manner known in the art. Preferably, it is positioned within a support structure 20. If desired, the support structure 20 may be omitted and the diaphragm 14 may be directly connected to the walls of the housing 12.

The diaphragm 14 may be formed from any suitable light opaque, heat resistant, and burn resistant. For example, the diaphragm 14 may be formed from vulcanized rubber or any other suitable material known in the art.

As shown in FIG. 1, chamber 16 is provided with a closeable opening 22. In its intended use, the opening 22 is opened to allow air at a desired pressure, such as ambient pressure, to enter chamber 16 at a desired point in time. If desired, the opening 22 may be connected to a device (not shown) for introducing air at a desired pressure into the chamber 16. Once the chamber 16 has been filled with air at the desired pressure, then the opening 22 is closed. The air within the closed chamber 16 is thus at a pressure which serves as "a reference pressure".

Figure 2:
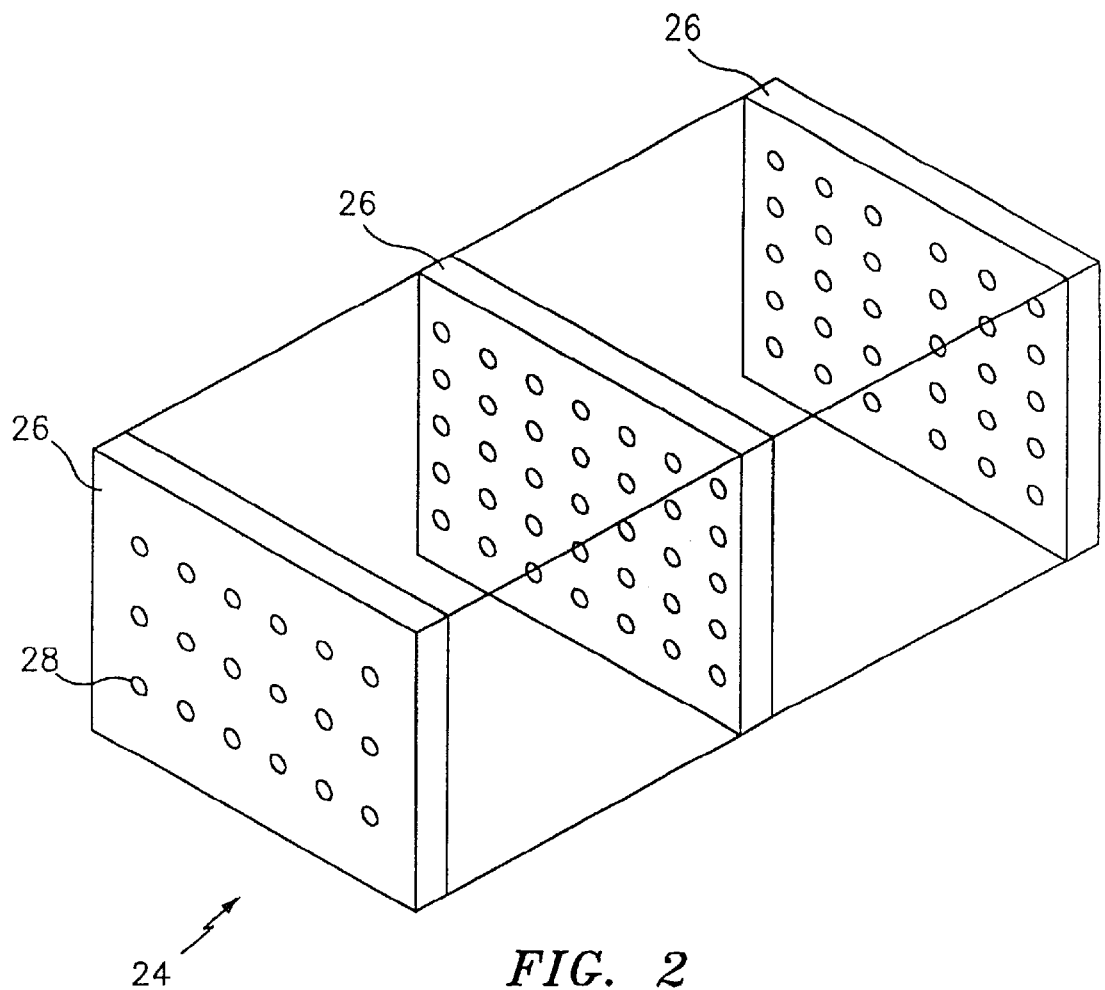
FIG. 2 is a perspective view showing the inlet to one of said chambers.

The chamber 18 communicates with the defined space 11 via an inlet opening 24. As shown in FIGS. 1 and 2, a number of panels or plates 26 are set within the inlet opening 24. Each panel or plate 26 may be formed from any suitable material known in the art, preferably a plastic material such as Plexiglass. Each panel or plate 26 is provided with a plurality of openings 28 for allowing air in the defined space 11 to flow into the chamber 18. To prevent air currents within the defined space 11 from causing the diaphragm 14 to move, the openings 26 in adjacent panels are offset. While the inlet opening 24 has been shown as having three panels or plates 26, the inlet opening 24 could have more than three panels or plates 26 if desired.

The defined space 11 is in fluid communication with an air introduction or withdrawal system 29. Typically, such a system includes a source of air 30, such as canisters of air under pressure, and means 32 for pumping said air into said defined space and for withdrawing air from said defined space. The pumping means 32 may comprise any suitable system known in the art for pumping air under pressure into the defined space and for withdrawing air from the defined space.

As shown in FIG. 1, a detection system 40 is provided to detect motion of the diaphragm 14 from its normal neutral position where the pressure in the chambers 16 and 18 is substantially the same. The detection system 40 includes a first means 42 for generating a first light beam on a first side of the diaphragm and first sensor means 44 for detecting the presence of the first light beam. The detection system 40 further includes a second means 46 for generating a second light beam on a second side of the diaphragm and second sensor means 48 for detecting the presence of the second light beam. The first and second light beam generating means 42 and 46 may comprise any suitable means known in the art for generating a light beam and the first and second sensor means may comprise any suitable sensors known in the art. In a preferred construction of the present invention, the first and second light beam generating means 42 and 46 comprise first and second lasers for generating a light beam at any desired frequency and with any desired strength.

The sensors 44 and 48 are in communication with the air introduction or withdrawal system 29. In operation, when sensor 44 does not sense the presence of the first light beam, it deactivates that portion of the system 29 which forms the means for introducing air into the defined space 11 and activates that portion of the system 29 which causes air to be withdrawn from the defined space. When the sensor 44 senses the presence of the first light beam again, that portion of the system 29 which causes air to be withdrawn from the defined space is deactivated. Further, when the sensor 48 does not sense the presence of the second light beam, that portion of the system 29 which forms the means for introducing air into the defined space is activated. When the sensor 48 again senses the presence of the second light beam, that portion of the system 29 which forms the means for introducing air into the defined space is deactivated. In this way, a balanced condition can be easily maintained between the chambers 16 and 18 and the pressure within the defined space 11 kept at a substantially constant level.

When used to control the air pressure within the passenger compartment of an aircraft, the housing 10 may be positioned within one of the bulkheads defining the passenger compartment. The housing 10 preferably is arranged so that the air inlet opening 24 receives air from the passenger compartment. If desired, the housing 10 could be arranged so that the air inlet opening 24 receives air from some other compartment such as the cockpit. The chamber 16 preferably contains air at a pressure equal to the ambient pressure at the point of origin of the flight. This is accomplished by filling the chamber 16 with ambient air prior to the aircraft's takeoff.

As can be seen from the foregoing description, the present invention provides a relatively simple system for maintaining the air pressure within a defined space at a substantially constant level, thus avoiding inconveniencing occupants within said defined space.

While the present invention was designed to be used in an aircraft, it could also be used in other environments. For example, the pressure regulation system of the present invention could be used to maintain the pressure within a positive air chamber such as those used in research laboratories. When used in such an environment, the chamber 16 may be filled with air having a pressure higher than ambient pressure. Any suitable means known in the art may be used to fill the chamber 16 with such high pressure air. The chamber 18, in such an environment, communicates with the interior of the positive air chamber. The pressure regulating system is then used to insure that the air within the positive air chamber is always above ambient pressure.

While the diaphragm movement detection system has been described in a preferred embodiment as being formed by light beam generating devices and light beam sensing devices, other detection devices known in the art may be used to detect movement of the diaphragm due to a pressure imbalance.

It is apparent that there has been provided in accordance with the present invention a pressure regulation system which satisfies the foregoing objects, means and advantages. While the present invention has been described in accordance with specific embodiments thereof, other modifications, variations, and alternatives will be apparent to those skilled in the art after reading the present description. Therefore, it is intended to embrace those modifications, variations and alternatives which fall within the broad scope of the appended claims.

What is claimed is:

1. A pressure regulation system comprising:
   a housing;
   a flexible diaphragm within said housing, said flexible diaphragm forming first and second chambers within said housing;
   said first chamber containing air at a desired pressure;
   said second chamber containing air at a pressure within a defined space outside said housing;
   means for detecting movement of said diaphragm due to a pressure imbalance between said first and second chambers;
   means responsive to said movement detecting means for eliminating said pressure imbalance; and
   said detecting means comprising means for generating a light beam on each side of said diaphragm.

2. A pressure regulation system according to claim 1, wherein said light beam generating means comprises a first laser and first means for detecting the presence of a first laser beam on a first side of said diaphragm and a second laser and second means for detecting the presence of a second laser beam on a second side of said diaphragm.

3. A pressure regulation system according to claim 2, wherein said pressure imbalance eliminating means comprises means for introducing air into and withdrawing air from said defined space.

4. A pressure regulation system according to claim 3, wherein said air introducing means is actuated when said second laser be am is not detected by said second detecting means and said air withdrawing means is actuated when said first laser beam is not detected by said first detecting means.

5. A pressure regulation system according to claim 3, wherein said defined space comprises an aircraft passenger cabin.

6. A pressure regulation system according to claim 1, further comprising a closeable opening into said first chamber for allowing air at said desired pressure to be introduced into said first chamber.

7. A pressure regulation system according to claim 1, further comprising an inlet opening between said defined space and said second chamber.

8. A pressure regulation system according to claim 1, further comprising said first chamber having a volume substantially equal to the volume of said second chamber.

9. A pressure regulation system comprising:
   a housing;
   a flexible diaphragm within said housing, said flexible diaphragm forming first and second chambers within said housing;
   said first chamber containing air at a desired pressure;
   said second chamber containing air at a pressure within a defined space outside said housing;
   means for detecting movement of said diaphragm due to a pressure imbalance between said first and second chambers;
   means responsive to said movement detecting means for eliminating said pressure imbalance;
   a closeable opening into said first chamber for allowing air at said desired pressure to be introduced into said first chamber; and a plurality of panels positioned within said opening between said defined space and said second chamber and each of said panels having a plurality of openings therein.

10. A pressure regulation system according to claim 9, wherein said plurality of openings in said panels are non-aligned with each other so as to reduce the impact of air currents within said defined space on said diaphragm.

11. A pressure regulation system comprising:

a housing;

a flexible diaphragm within said housing, said flexible diaphragm forming first and second chambers within said housing;

said first chamber containing air at a desired pressure;

said second chamber containing air at a pressure within a defined space outside said housing;

means for detecting movement of said diaphragm due to a pressure imbalance between said first and second chambers;

means responsive to said movement detecting means for eliminating said pressure imbalance; and said diaphragm being formed from a light opaque, inflammable, heat resistant material.

12. An air pressure maintaining system comprising:

a housing;

a diaphragm positioned within said housing for dividing said housing into first and second chambers;

said first chamber containing air at a reference pressure;

said second chamber being in fluid communication with said passenger cabin and containing air at passenger cabin air pressure;

means for detecting movement of said diaphragm caused by a pressure imbalance between the first and second chambers;

means responsive to said movement detecting means for eliminating any pressure differential between the first and second chambers and thereby maintain the passenger cabin at a substantially constant air pressure; and said movement detecting means comprising a first laser on a first side of said diaphragm for generating a first light beam and a first means for detecting the presence of said first light beam and a second laser on a second side of said diaphragm for generating a second light beam and a second means for detecting the presence of the second light beam.

* * * * *

UNITED STATES PATENT AND TRADEMARK OFFICE
CERTIFICATE OF CORRECTION

PATENT NO. : 6,241,599 B1
DATED : June 5, 2001
INVENTOR(S) : David L. Katz

Page 1 of 1

It is certified that error appears in the above-identified patent and that said Letters Patent is hereby corrected as shown below:

<u>Column 4, claim 4,</u>
Line 35, change "be am" to read -- beam --.

Signed and Sealed this

Fifth Day of March, 2002

Attest:

JAMES E. ROGAN
Director of the United States Patent and Trademark Office

*Attesting Officer*